United States Patent
Zong et al.

(10) Patent No.: US 11,714,966 B2
(45) Date of Patent: Aug. 1, 2023

(54) COGNITIVE RESPONSES WITH ELECTRONIC MESSAGING

(71) Applicant: INTERNATIONAL BUSINESS MACHINES CORPORATION, Armonk, NY (US)

(72) Inventors: Dong Jun Zong, Beijing (CN); Jonathan Dunne, Dungarvan (IE); Da Li Liu, Beijing (CN); Jing Xing, Beijing (CN); Xue Fei Duan, Beijing (CN); Mark Wallace, Blackrock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 16/190,128

(22) Filed: Nov. 13, 2018

(65) Prior Publication Data

US 2020/0151255 A1     May 14, 2020

(51) Int. Cl.
    *G06F 40/30*     (2020.01)
    *G06N 20/00*     (2019.01)
    *H04L 67/12*     (2022.01)

(52) U.S. Cl.
    CPC ............ *G06F 40/30* (2020.01); *G06N 20/00* (2019.01); *H04L 67/12* (2013.01)

(58) Field of Classification Search
    CPC ........ G06F 16/285; G06F 3/167; G06F 40/30; G06F 16/35; G06F 16/353; G06F 40/295; G06F 16/24578; G06F 40/216; G06F 16/435; G06F 40/35; G10L 15/22; G10L 2015/223; G10L 25/51; G10L 19/00; G10L 25/18; G10L 21/10; G10L 25/48; G10L 25/54; G10L 13/00; G10L 15/005; G10L 15/04; G10L 15/08; G10L 2015/088; G10L 2015/221; G10L 21/06; G10L 25/21; G10L 25/39; G10L 25/87; G10L 13/08;

(Continued)

(56) References Cited

U.S. PATENT DOCUMENTS 8,364,766 B2 *    1/2013    Zheng .................... H04L 51/12
                                                        709/206
8,645,473 B1      2/2014    Spitkovsky (Continued)

FOREIGN PATENT DOCUMENTS

CN        105164719 A     12/2015
WO      2014159000 A3     10/2014

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

*Primary Examiner* — Huyen X Vo
(74) *Attorney, Agent, or Firm* — Cuenot, Forsythe & Kim, LLC (57) ABSTRACT

Providing cognitive responses with an electronic message system includes predicting an urgency level corresponding to an electronic message received by the system based on detecting pre-defined features within the message and assigning a classification to the message based on the detected features. The message and corresponding urgency level can be mapped to a response action based on the classification assigned to the message. A notification of the response action and corresponding urgency level can be generated.

20 Claims, 8 Drawing Sheets

(58) Field of Classification Search
CPC ......... G10L 15/26; G06N 20/00; H04L 67/12; H04L 12/2803; H04L 29/08; G05B 19/4185; A63F 13/30
See application file for complete search history.

(56) References Cited

U.S. PATENT DOCUMENTS

| | | | |
|---|---|---|---|
| 9,998,413 | B2 | 6/2018 | Shen et al. |
| 2010/0153325 | A1 | 6/2010 | Amoroso et al. |
| 2010/0332428 | A1 | 12/2010 | McHenry et al. |
| 2012/0290662 | A1 | 11/2012 | Weber et al. |
| 2013/0159408 | A1* | 6/2013 | Winn .................... G06Q 10/10 709/204 |
| 2013/0288722 | A1* | 10/2013 | Ramanujam ............ H04L 51/26 455/466 |
| 2013/0342315 | A1 | 12/2013 | Verstraete |
| 2014/0236596 | A1* | 8/2014 | Martinez ............... G10L 15/265 704/235 |
| 2014/0280616 | A1 | 9/2014 | Ramanathan et al. |
| 2015/0200899 | A1* | 7/2015 | Sanketi .................. H04L 51/24 709/206 |
| 2015/0350146 | A1* | 12/2015 | Cary .................. H04L 67/2823 709/206 |
| 2016/0226811 | A1 | 8/2016 | Kerschhofer et al. |
| 2017/0034103 | A1* | 2/2017 | Karuppasamy ......... H04L 51/26 |
| 2017/0222956 | A1* | 8/2017 | Jain ........................ H04L 51/26 |
| 2017/0289093 | A1* | 10/2017 | Snider .................... H04L 51/26 |
| 2018/0219817 | A1* | 8/2018 | Zang ..................... H04L 67/322 |
| 2019/0036863 | A1* | 1/2019 | Bonham ................. G06F 40/30 |
| 2020/0092245 | A1* | 3/2020 | Hewitt ................... H04L 51/26 |
| 2020/0133691 | A1* | 4/2020 | Goenka ................. G06F 3/0482 |
| 2020/0314797 | A1* | 10/2020 | Mei .................... H04M 1/72552 |

* cited by examiner

| Features | Feature Value |
|---|---|
| X1= Sender | DAble@AcmeCo.com |
| X2= To List | TBaker@AcmeCo.com<br>HCharlie@AcmeCo.com |
| X3= CC List | |
| X4= Mail ID | 2384-E3G9 |
| X5= Subject | Disclosure review comments discussion |
| X6= Sent Time | 2018/5/3 13:43 |
| X7= Message Content | Johnathan has provided comments in Box. We need to address all his comments ASAP. Let's discuss first. Please go through all the comments before we discuss. |
| X8= Importance Flag | ==T |

| Urgency Level | Meaning |
|---|---|
| 1 | Take immediate action |
| 2 | Take action within a specified time |
| 3 | Take action by a specified date |
| 4 | No action necessary |

COGNITIVE RESPONSES WITH ELECTRONIC MESSAGING

BACKGROUND OF THE INVENTION

This disclosure pertains to data processing, and more particularly, to processing data in electronic messages such as email and voice mail.

Email and similar types of electronic messaging provide efficient modes of communication that offer certain advantages over mail and more conventional forms of communication. The use of email and similar types of electronic messaging is prevalent among virtually all sectors of modern society and is used for exchanges of all types of messages. Indeed, it is a critical component of today's fast-paced, interconnected business environment in which volumes of email and similar type messages are exchanged daily.

SUMMARY

A method includes predicting, with a data processing system, an urgency level corresponding to an electronic message received by the system based on detecting pre-defined features within the message and assigning a classification to the message based on the detected features. The method can include mapping the message and corresponding urgency level to a response action based on the classification assigned to the message. Additionally, the method can include generating a notification of the response action and corresponding urgency level.

A system includes a processor programmed to initiate executable operations. The operations include: predicting an urgency level corresponding to an electronic message received by the system based on detecting pre-defined features within the message and assigning a classification to the message based on the detected features; mapping the message and corresponding urgency level to a response action based on the classification assigned to the message; and generating a notification of the response action and corresponding urgency level. The system can learn to identify the pre-defined features within the message and to classify the message based on the identified features.

A computer program product includes a computer-readable storage medium having program code stored thereon. The program code executable by a data processing system to initiate operations. The operations include predicting, with the data processing system, an urgency level corresponding to an electronic message received by the system based on detecting pre-defined features within the message and assigning a classification to the message based on the detected features. The operations also include mapping the message and corresponding urgency level to a response action based on the classification assigned to the message. The operations further include generating a notification of the response action and corresponding urgency level.

DETAILED DESCRIPTION

The present disclosure relates to data processing and, more specifically, to processing character-based and other forms of data contained in electronic messages, such as email and voice mail.

Electronic messaging, particularly via email, has become one of the most import modes of modern communication. This is especially so in the context of business communication. A large part of work-related activities today is related to receiving and responding to electronic messages. The speed and efficiency gained through electronic messaging is a significant benefit to virtually all types of activities, commercial and otherwise. Nevertheless, responding to electronic messages can be a daunting task for some individuals given the sheer volume of electronic messages the individuals receive on a regular basis. Even for an individual that does not receive a large volume of electronic messages, distinguishing urgent messages from routine ones can be an unwanted distraction.

The present disclosure describes various embodiments of a cognitive system that can predict an urgency level corresponding to a received electronic message and map the message to a specific action to be taken in response. As described herein, the system can predict the urgency level by classifying the received electronic message based on the message content. The system "builds" a classification model using machine learning to recognize different content patterns (pre-defined features) and to classify each message based on the particular content pattern contained in the message.

The system preferably classifies content in electronic messages using a Discriminant Function. Other approaches also can be used, such as a Naive Bayes Classifier, Logistic Regression Support Vector Machine, Random Forrest, or similar type of supervised machine learning classification algorithm. These approaches can be coupled with natural language processing in building the classification model. The classification model is built using a corpus of training data made up of collected electronic messages. Each message comprises identifiable features and is appropriately labeled with a correct classification so that model predictions generated by the system can be compared with desired results to assess model accuracy. The system learns to classify messages by iteratively adjusting parameters of the classification model through successive training epochs or instance-by-instance updating until an acceptable accuracy level is achieved.

Additionally, the system also can provide a system override function to improve system learning. According to this embodiment, a user provides system feedback by overriding a system-generated classification. The user feedback prompts the system to respond by reconfiguring the classification model so that the system more accurately maps specific message content to an appropriate response and corresponding urgency for responding.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
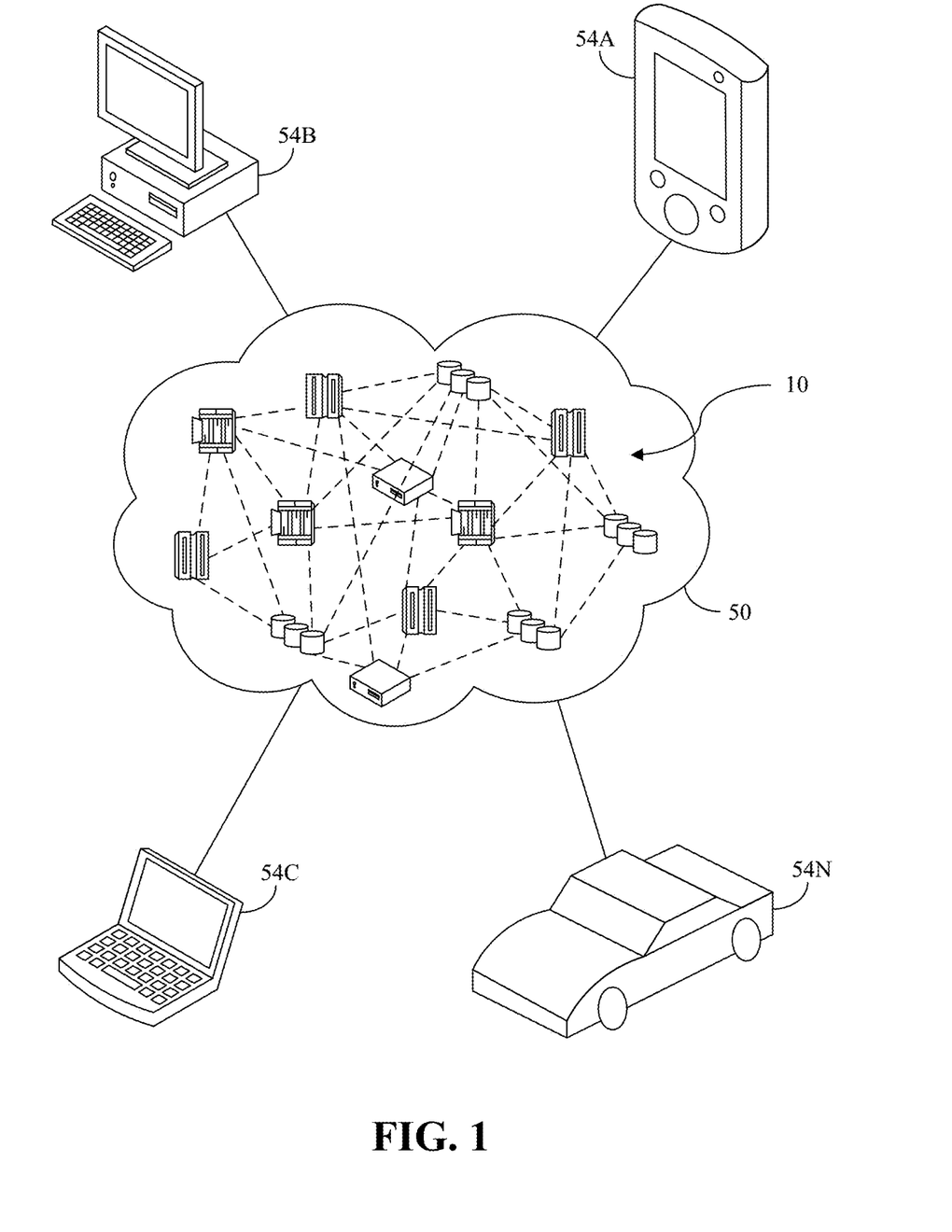
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
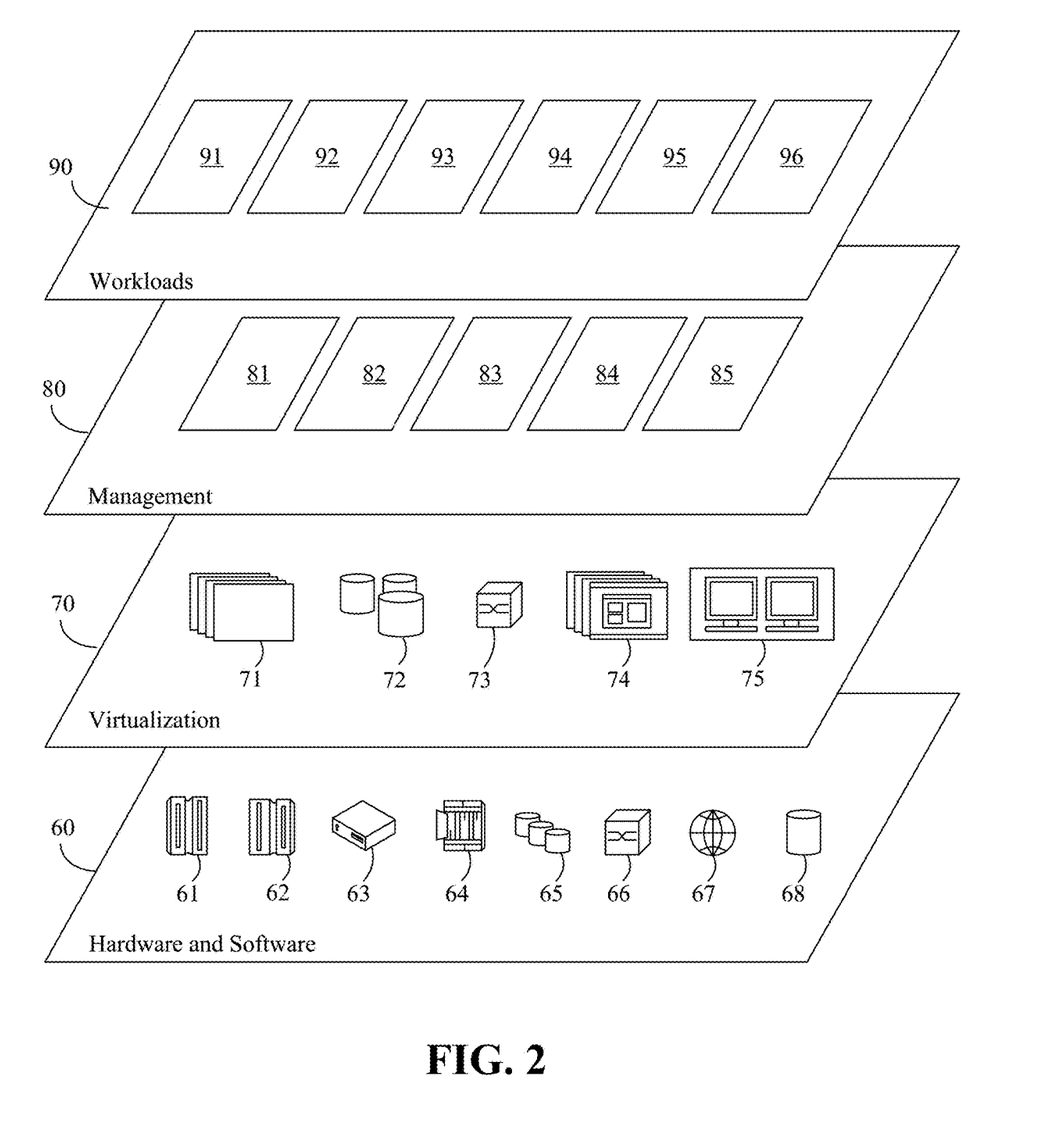
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic message processing using a cognitive system 96 to predict, actuate, and prioritize responses to received electronic messages.

In one or more embodiments, system 96 predicts an urgency level corresponding to a received electronic message based on message content. System 96 maps different messages and corresponding urgency levels to different actions to take in response to a received electronic message. As defined herein, an "electronic message" means data capable of being processed with a data processing system, such as a computer. Data comprising an electronic message thus include alpha-numeric character data as well as digital data converted from, or representative of, an analog signal. An "action response," as defined herein, encompasses more than merely responding to an electronic message (e.g., respond, save, or forward) and includes actions such as calling an emergency meeting, initiating a job task, scheduling an event, or other action. As also defined herein, "urgency level" is a predefined designation indicating how quickly an action should be undertaken.

System 96 is cognitive in that the system learns to predict an urgency level corresponding to received electronic messages by recognizing content patterns contained in the messages. Based on pattern recognition, system 96 classifies a received electronic message and thereby assigns an urgency level to the message. System 96 maps different classifications to specific action responses, the urgency level dictating when the action response is, or should be, initiated.

In an exemplary embodiment, system 96 utilizes a Discriminant Function coupled with natural language processing to construct a classification model for classifying electronic messages. Other approaches, such as Naive Bayes Classifier, Logistic Regression Support Vector Machine, Random Forrest, or similar supervised machine learning classification algorithm, can be used in different embodiments. For example, system 96 can learn to predict urgency levels corresponding to electronic messages and map messages to response actions by identifying pre-defined features and classifying the messages based on the features according to a classification model. The classification model can be trained by system 96 using a corpus of training data comprising collected electronic messages. Each message used to "train," or construct, the classification model comprises identifiable features and is appropriately labeled with a correct classification so that model-based predictions can be compared with desired results to assess model accuracy. Training comprises iteratively adjusting the classification model's parameters through successive training epochs or instance-by-instance updating until an acceptable accuracy level is achieved. Through learned pattern recognition and message classification, system 96 can generate a function that maps a message or class of messages to a specific action response, as well as a corresponding urgency level.

Additionally, system 96 can provide an override function to improve system learning. According to this embodiment, a user provides system feedback by overriding a system-generated classification. The user feedback provides a prompt to which the system automatically updates the model parameters thereby refining the classification model so that the system more accurately maps specific message content to an appropriate response and corresponding urgency level.

An aspect of system 96 is that the system does not merely monitor user reactions (e.g., read, respond, save, or forward) to an electronic message so as to predict a similar response to a subsequent electronic message (although such actions are among possible ones provided by the system). Rather, system 96 analyzes the message content itself, including verbal and even emotive content. Indeed, in one embodiment of system 96, if a system user responds by voice or email to a received electronic message, the verbal and/or emotive content of the user's response can be used to train the system and to classifying received messages. These and additional aspects of system 96 are described below in greater detail.

Figure 3:
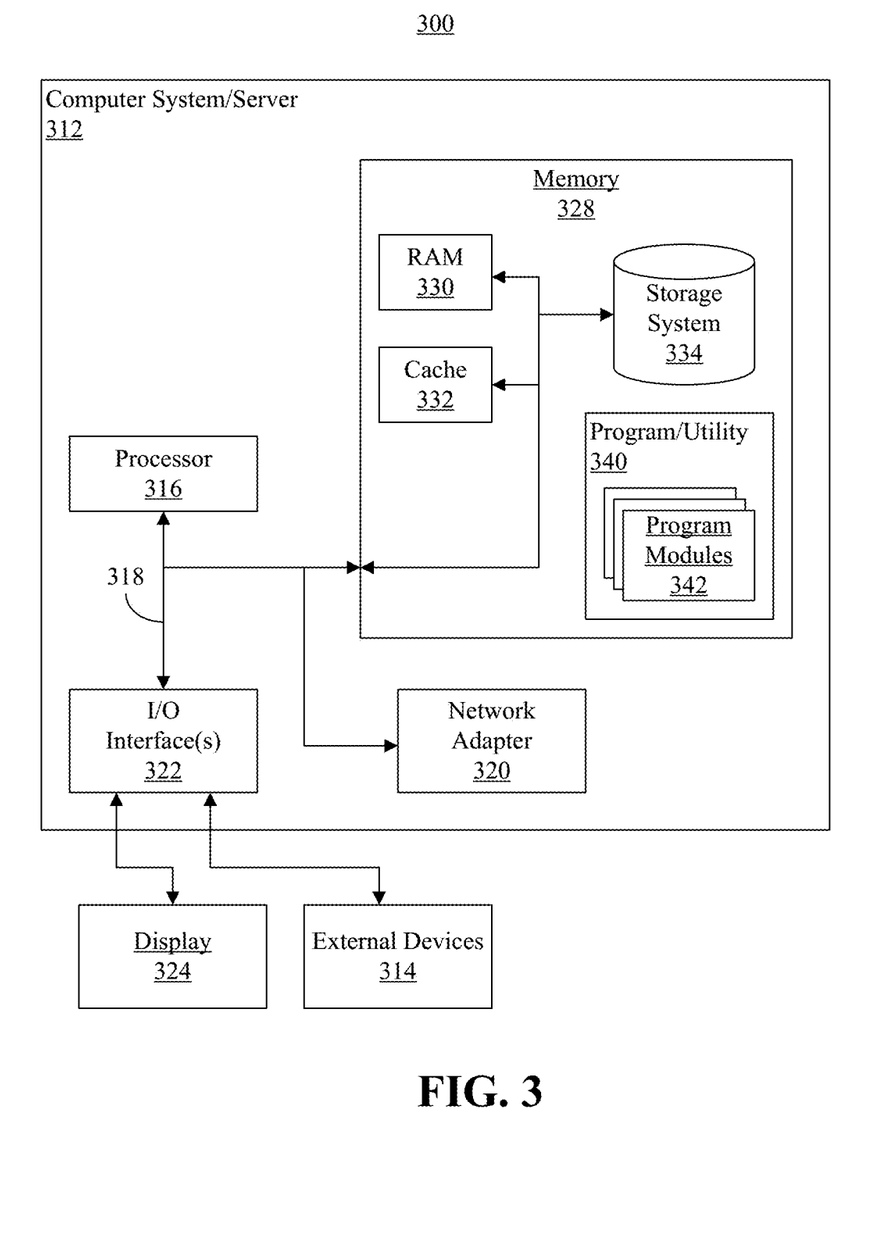
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes computer 312, which is operational with numerous other general-purpose or special-purpose computing system environments or configurations. Examples of well-known computing systems, environments, and/or configurations that can be suitable for use with computer 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 312 can be described in the general context of computer system-executable instructions, such as program modules, being executed by a computer system. Generally, program modules can include routines, programs, objects, components, logic, data structures, and so on that perform specific tasks or implement particular abstract data types. Computer 312 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 3, computer 312 in cloud computing node 300 is shown in the form of a general-purpose computing device. The components of computer 312 can include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer system readable media. Such media can be any available media that is accessible by computer 312, and it includes both volatile and non-volatile media, removable and non-removable media.

Memory 328 can include computer system readable media in the form of volatile memory, such as random-access memory (RAM) 330 and/or cache memory 332. Computer 312 can further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 can include at least one program product having a set (e.g., at least one) of program modules that are configured to carry out the functions of embodiments of the invention.

Program/utility 340, having a set (at least one) of program modules 342, can be stored in memory 328 by way of example, and not limitation, as well as an operating system, one or more application programs, other program modules, and program data. Each of the operating system, one or more application programs, other program modules, and program data or some combination thereof, can include an implementation of a networking environment. Program modules 342 generally carry out the functions and/or methodologies of embodiments of the invention as described herein.

For example, one or more of the program modules can include modules implementing the operative features of system 96 or portions thereof. Program/utility 340 is executable by processing unit 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 can also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Still yet, computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components can be used in conjunction with computer 312. Examples include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 can be used in a non-cloud computing implementation to perform the various operations described herein. In this regard, the example embodiments described herein are not intended to be limited to a cloud computing environment.

Figure 4A:
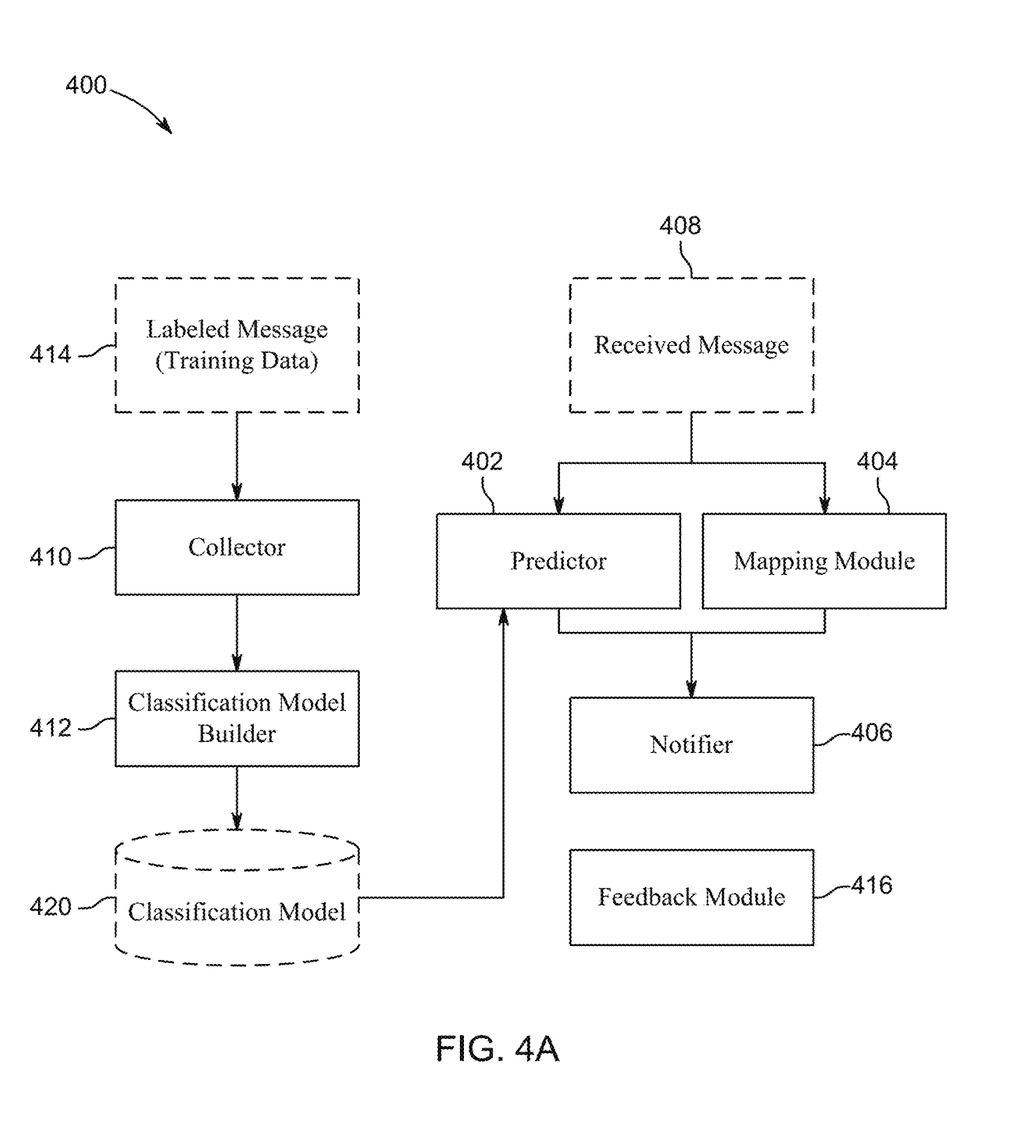
FIG. 4A depicts an example architecture of a system for responding to electronic messages according to an embodiment of the present invention.

System 96 can be implemented, for example, in computer 312 as processor-executable code running on processor 316. Referring additionally to FIG. 4A, an example architecture 400 of one embodiment of system 96 is shown. Illustratively, system architecture 400 includes predictor 402 for predicting an urgency level corresponding to a received electronic message and mapping module 404 for mapping the message to a specific response action and corresponding urgency level. System architecture 400 also illustratively includes notifier 406, which generates a user notification that a specific response action should be taken within a specified timeframe or by a certain indicated time. Based on the example architecture, system 96 responds to a received electronic message 408 by predicting an urgency level corresponding to the message and mapping the message to a specific action to take within a predetermined time or by a certain specified date, which are notified by the system to a system user.

System architecture 400 also illustratively includes collector 410 for collecting data used in generating a classification model. Collector 410 can include I/O interface 322 by which data can be supplied to system 96 directly by a user or through a separate device, such as a smart phone or other communication device. The classification model is generated by classification model builder 412. Classification model builder 412 constructs, or "trains," the classification model 420 using training data 414. The classification model 420 can be stored in memory such as memory 328 of computer 312. As described in detail below, the classification model, once constructed, can be modified by the system based on user input provided via the feedback module 416.

The classification model 420 provides a classifier, or function, such as the discriminant function, which determines a score for a received electronic message. The score is computed as a function of a feature vector, or a set of features identified in the electronic message. The score dictates the classification assigned to an electronic message, that is, determines to which of a given set of categories or classes the particular message belongs. Each class corresponds to a different urgency level. Thus, by classifying the electronic message based on message content, predictor 402 predicts the corresponding urgency level of the message and mapping module 404 maps the message to a designated action, both of which are notified to a system user by notifier 406.

Different classification models can be constructed by classification model builder 412. For example, one classification model is based on the discriminant function. A generalized linear discriminant function is given as $$g(x) = \Sigma^d_{i=1} a_i y_i(x),$$

or, in vector form, as $$g(x) = a^t y$$

where x is the feature vector, a is a d-dimensional weight vector and each $y_i(x)$ is an arbitrary function of x. In the present context, each electronic message represents an observation or instance, each message being associated with a specific feature vector x reflecting particular attributes of the message content. Classifying a specific instance—that is, the particular electronic message—entails computing a value g(x). The accuracy of prediction ultimately depends on the weights $a^t = (a_1, a_2, \ldots, a_d)$ that determine the value computed based on the feature vector x.

In other embodiments, the classification model can be constructed using, for example, a Naive Bayes Classifier, Logistic Regression Support Vector Machine, Random Forrest, or similar supervised machine learning classification algorithm.

Classification model builder 412 can build the classification model through supervised learning to appropriately classify a set of training data 414. Learning comprises classifying a set of instances (electronic messages) whose proper classifications are known and comparing the model-generated results with the proper classifications to determine model accuracy. Classification model builder 412 can iteratively adjust the weights until the model generates results with an acceptable level of accuracy.

Classification model builder 412 can construct the classification model to analyze the verbal and emotive content of an electronic message. In a particular embodiment, classification model builder 412 comprises computer-implemented code for causing processor 316 to analyze the linguistic content in a message by identifying words in phrases or sentences and performing lexical analysis by converting sequences of characters comprising the identified words or phrases into a sequence of identifiable tokens or strings having pre-assigned meanings. Thus, classification model builder 412 can, for example, identify words and phrases in the message whose assigned meanings denote specific emotions. The verbal content can comprise part of the feature vector.

Figure 4B:
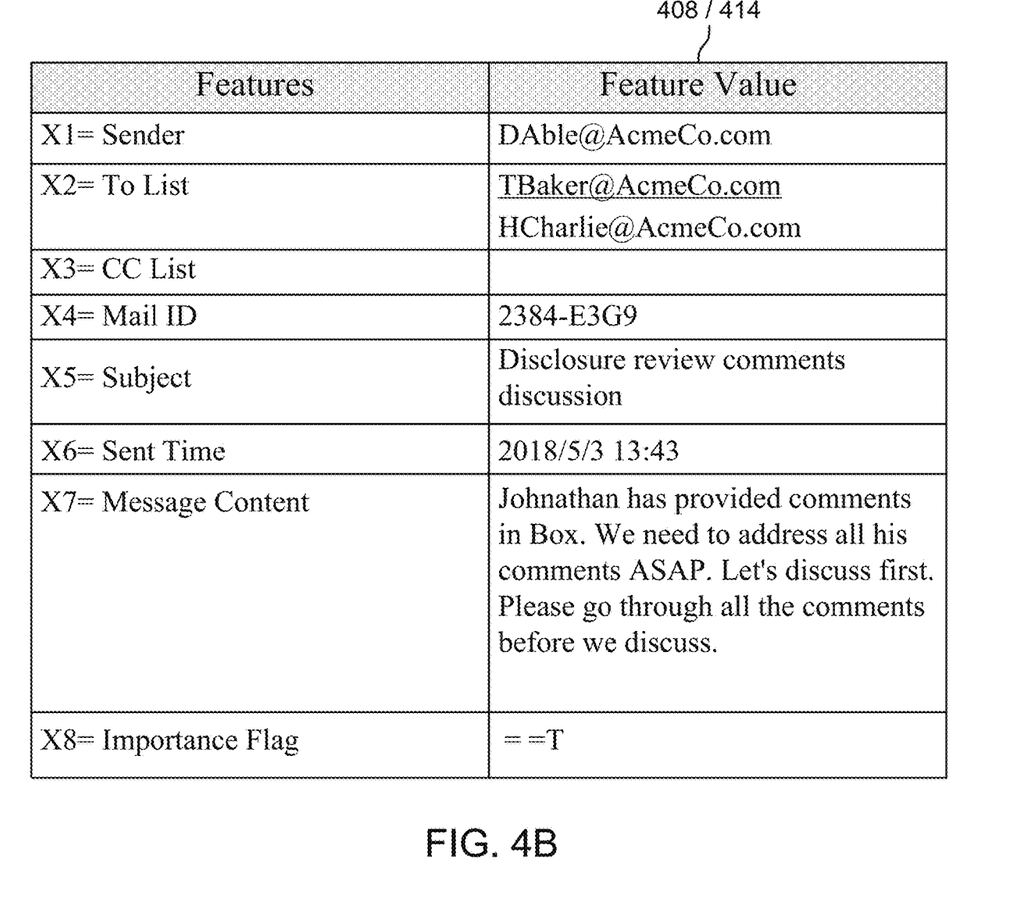
FIG. 4B depicts an example set of electronic message features.

The feature vector of a message (received message 408 or instance of training data 414) is illustrated by the example shown in FIG. 4B in the context of email messaging. In the example, the d-dimensional feature vector is an eight-tuple comprising: Sender, To List, CC list, Mail ID, Subject, Sent Time, Message Content, and Importance Flag. As one of a corpus of training data for training the classification weights, the email is labeled according to the message's assigned urgency and the action taken in response to the message by the message recipients. As a received message, the message is classified according to the value computed by the predictor 402 to predict the urgency level and action response.

Because the feature values illustrated in FIG. 4B are categorical in nature, quantitative data conversion can be used to facilitate the score computation. In a particular embodiment, values can be normalized (between −1 and 1) as part of a data preparation stage and fed into a co-variance matrix. In another embodiment, for example, different senders can be assigned different numerical values to reflect importance or likely urgency associated with the sender. Because the corpus of training data can be unique to a specific user or group of users, classification model builder can construct a classification model that recognizes certain message senders are typically associated with more urgent messages. A value for the To List feature can be based, for example, on the number of recipients listing, reflecting that more important or urgent messages typically have wider dissemination. With respect to message content, the assigned value can be based on the number of times certain defined key words or expressions (e.g., "urgent" or "immediate response required") appear in the message. Different weights are assigned to different features through training. Thus, for example, although a message sent to a large number of recipients can be classified as an urgent message, an individual word such as "urgent" can be weighted such that a message containing that word, even sent to a single recipient, is classified as extremely urgent.

Operatively, construction of the classification model by system 96 can initially include a system user's specifying a mode (e.g., text message or voice message) of communication and identifying message features to be collected by collector 410 and analyzed by classification model builder 412. For example, if a user selects email messaging as the mode, the user can specify the fields, such as Sender, To List, CC List, Mail ID, Subject, Sent Time, Message Content (body of the message), and Importance Flag. The user can also specify emotive and other verbal content (words and phrases) to be extracted and analyzed from the body of the message. Likewise, if the selected messaging mode is voice messaging, the user can specify key words and/or phrases, such as "urgent" and "immediate response requested" that collector 410 can search for and extract from each voice message for use by the classification model builder 412.

In one embodiment, the user can provide a training corpus of collected emails or voice messages from which the specified field data and/or words and phrases are extracted by the collector 410 and relayed to the classification model builder 412. In another embodiment, the user specifies the fields and/or words and phrases that collector 410 collects and stores email or voice messages on an on-going basis to build up a corpus of training data.

If the classification model is built, or trained, through supervised learning each instance, or observation, of training data (electronic message features) is labeled to indicate the correct response action and corresponding urgency level. In one embodiment, the system user can specify a response action and corresponding urgency level for each instance of training data.

In another embodiment, however, the system 96 can autonomously label each instance by detecting responses to received electronic messages. For example, in the specific context of email messaging, an email message can prompt a user to take one of several responses: delete the message immediately, take no action for an extended duration, mark the message for follow-up. These actions can be recorded and used by the classification model builder 412 to infer the urgency level of the message: delete implying no urgency; saving the message, but without immediately responding implying moderate urgency; and marking for follow-up implying high urgency. The system 96 likewise can analyze verbal and emotive contact, and thus, if the recipient acts by sending a separate or reply message, the verbal content can be analyzed by the system to infer urgency. For example, if the user responds to a message by sending a reply text message that reads "set up a meeting right away," the system can infer that the message had a high level of urgency. In another embodiment, in which system 96 includes voice recognition capabilities, recipient can respond with a voice message. A voice message such as "set up a meeting right away" can be recognized by system 96 as being one of high urgency. Thus, in both instances, classification model builder 412 infers action and urgency level based on the verbal response of the recipient, whether written or spoken.

Autonomous labeling as just described is facilitated by feedback module 416. Correct labeling is critical to building, or training, the classification model. Thus, in one embodiment, as the collector 410 builds a corpus of training data, inferred urgency levels assigned to individual observations (electronic messages) can be notified to the user, permitting the user to provide feedback via module 416. For example, the user can simply enter a yes or no vote, a no vote acting as a system prompt for the classification model builder 412 to adjust the model through additional training. Moreover, in another embodiment, after the classification model is constructed, if predictor 402 incorrectly classifies a message leading to an incorrect urgency level being assigned to the message, the model can be modified by additional training in response to a user-supplied no vote expressed via feedback module 416. In yet another embodiment, the feedback module 416 permits the user to select a score expressing a level of satisfaction/dissatisfaction with a system-generated result (e.g., a net promotor score from one to 10, 10 indicating a high level of satisfaction).

Figure 4C:
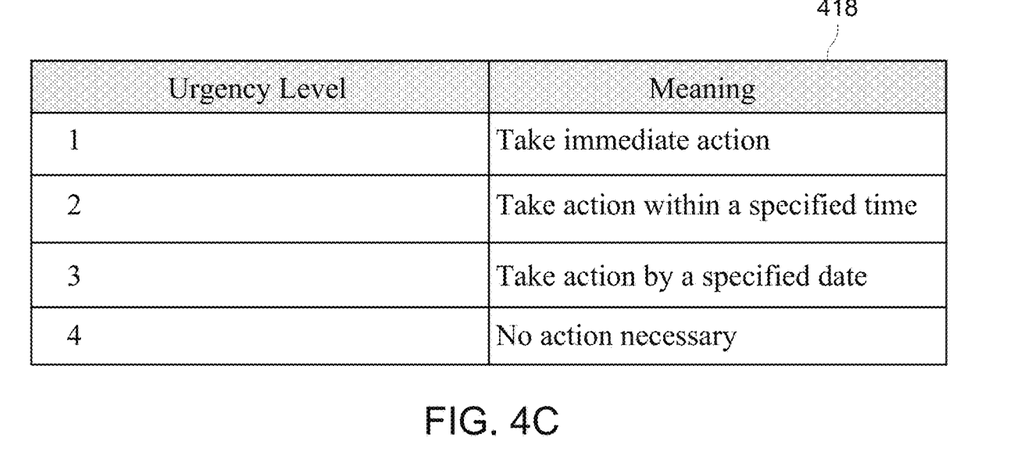
FIG. 4C depicts an example set of urgency levels generated according to an embodiment of the present invention.

By constructing the classification model as described, the classification model builder 412 establishes specific parameters for use by predictor 402 in classifying a received message 408 based on the content of the message. The identified features of the message are the inputs to the function which generates the value that determines the classification of the message. Collectively, the specific features comprise a content pattern. Thus, as with pattern recognition more generally, predictor 402 recognizes the content pattern of the message and classifies the message accordingly. FIG. 4C illustrates a classification set 418, indicating discrete set of urgency levels and a corresponding timeframe within which action is to be taken in response to a received message.

The different urgency levels corresponding to different messages, such as depicted in FIG. 4C, can be displayed within a messaging client on which system 96 is running and/or provided to another system executing a messaging client where the client displays visual indicators of urgency level in association with the respective messages displayed and/or listed therein. Further, messages within a messaging client can be sorted or ordered according to urgency level and displayed with the urgency level-based categorization. Various visual indicators can be used to enable a user to distinguish between messages that require immediate attention and those that do not. In other embodiments, in which the particular messaging client has voice capabilities, a pre-recorded voice message, for example, can play in response to a received message being classified has having high-level urgency.

Based on the classification of the received message, mapping module 404 maps a specific action to the messages and corresponding message level. The classification model, as already noted, is inherently customizable to a specific individual or organization, given that the training corpus will reflect attributes (messengers, message content, and response actions) uniquely associate with individual or organization. Accordingly, actions can be associated with messages based on the classification of the messages. The specific actions can be recommended to a user with a visual display or voice message within the user's messaging client.

Figure 4D:
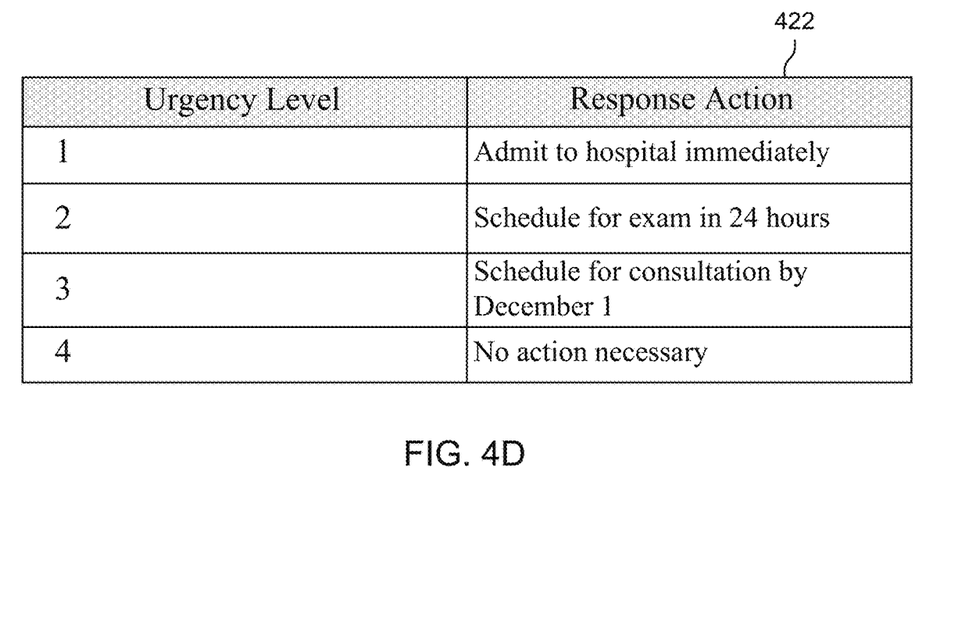
FIG. 4D depicts another example set of response actions generated according to an embodiment of the present invention.

FIG. 4D illustrates a set of urgency levels and corresponding actions 422 in the context of a medical practice, for example. A message (e.g., email, voice) in this context can be classified such that mapping module 404 maps specific action responses to patient messages with corresponding urgency levels. These can include a message describing a patient's condition warranting immediate admittance to a hospital. Another message might evoke moderate concern sufficient to prompt scheduling the patient for a medical exam within 24 hours. Yet another message might be classified as having only a low-level urgency, leading to scheduling a consultation by a certain date. Another message classified as having no urgency corresponds to a no-action-necessary response.

In certain embodiments, system 96 includes automatically initiating a response action. For example, a response action such as schedule appointment within 24 hours mapped by mapping module 404 to a message from a certain sender can prompt system 96 to initiate scheduling and appointment through a communications link to a separate scheduling system.

Figure 4E:
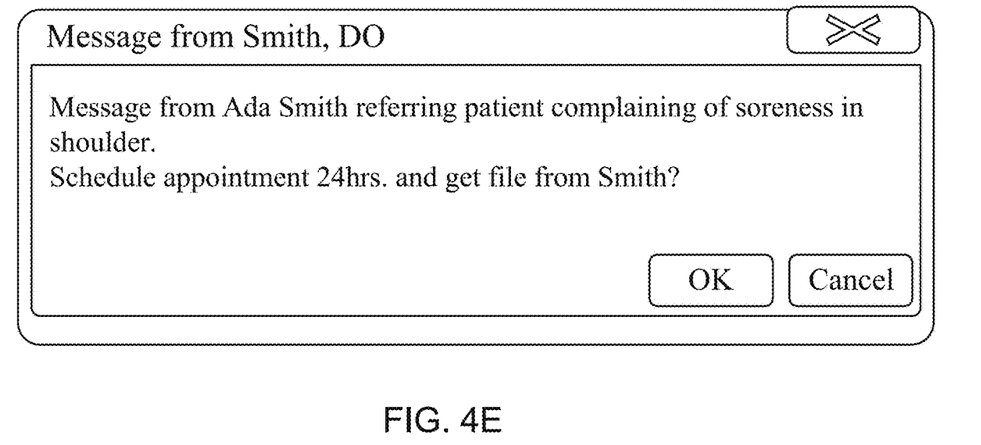
FIG. 4E depicts an example prompt generated according to an embodiment of the present invention.

FIG. 4E depicts an example prompt generated by notifier 406. The prompt is generated by system 96 in response to mapping module 404 mapping a response action to a message and predictor 402 predicting a corresponding level of urgency. The prompt is illustrative of one that might be encountered in the context of the aforementioned medical practice in which a received electronic message (e.g., email, voice message) is predicted by predictor 402 to have moderate urgency and is mapped by mapping module 404 to a suggested response action to schedule an appointment within 24 hours. The prompt affords a system user an opportunity to provide feedback via feedback module 416. In one embodiment, system 96 responds to selecting cancel rather than OK with a second prompt (not shown) allowing the user to provide user input. In one embodiment user can register a level of satisfaction/dissatisfaction with the prediction and/or recommended action through the feedback module 416. In another embodiment, the user is prompted to specify an urgency level that should have been predicted and/or action that should have been recommended. In both embodiments, feedback module 416 responds to user by initiating a new round of training by the classification model builder 412 to update the classification model. Specifically, the discriminant function weights $a'=(a_1, a_2, \ldots, a_d)$ are updated by system 96 to achieve better classification accuracy in response to the user-supplied feedback.

Figure 5:
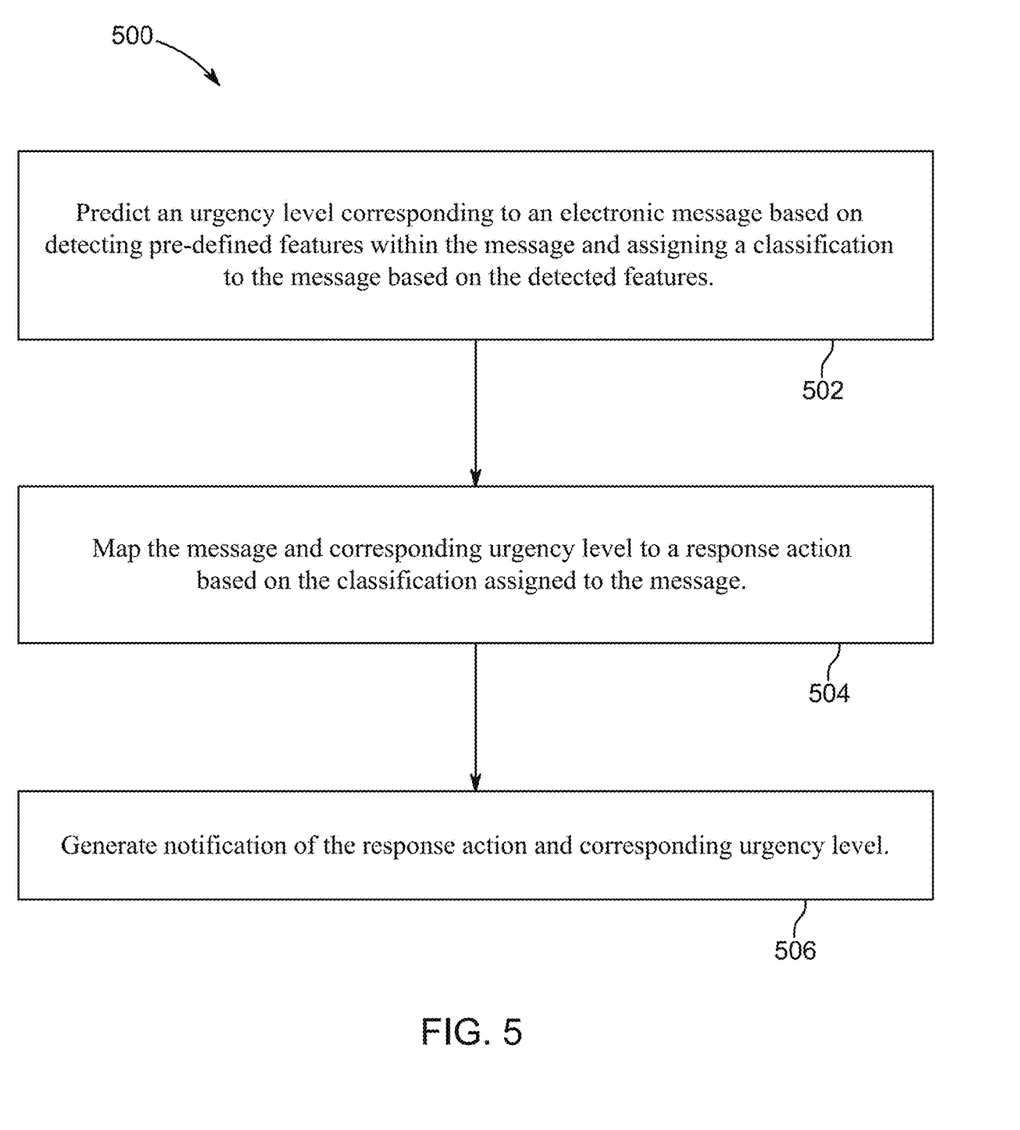
FIG. 5 is a flowchart of a method of predicting a message urgency level and mapping the message to a response action according to an embodiment of the present invention.

FIG. 5 is a flowchart of a method 500 of predicting an urgency level corresponding to a received electronic message and mapping the message to a specific action to be taken in response. Method 500 can be performed by a system the same or similar to the system described in connection with FIG. 3 and having an architecture the same or similar to the architecture described in connection with FIG. 4A. Method 500 can begin with the system receiving an electronic message. At 502, the system predicts an urgency level corresponding to the electronic message based on detecting pre-defined features within the message and assigning a classification to the message based on the detected features. The system maps the message and corresponding urgency level to a response action, at 504, based on the classification assigned to the message. The system at 506 generates a notification of the response action and corresponding urgency level. The notification can be conveyed by the system to a system user. The notification serves to predict for the user the message's urgency and to recommend a response action based on the system's classification of the message.

In predicting the urgency level corresponding to the electronic message and mapping the message and corresponding urgency level to a response action, the system assigns a classification to the message based on a system-constructed classification model. The assigned classification indicates to which one of a set of pre-defined classes a particular message belongs. The identified features on which the classification is based can include verbal content, which can specifically include emotive content. The system "learns" to identify pre-defined features within the message and to classify the message based on the identified features using any of the machine learning techniques. That is, system can iteratively construct and refine the classification model, such as the discriminant function, by iteratively adjusting a weight vector $a^t=(a_1, a_2, \ldots, a_d)$, as described above, to improve classification accuracy.

Optionally, method 500 can also include initiating with the system the system-identified response action. For example, the system can initiate the scheduling of an appointment within a designated time by interacting with a separate scheduling system. The system allows a user to respond to the notification by accepting or rejecting the noticed urgency level and action response via feedback module. If the user rejects the urgency level and action response in the notification, the rejection prompts the system to modify the classification model to improve the system's accuracy in classifying messages. Specifically, the system can modify the model parameters (e.g., weight vector $a^t=(a_1, a_1, \ldots, a_d)$ of the discriminant function) to generate a different classification result and improve classification accuracy. The user, optionally, can specify with respect to an incorrectly classified message a desired urgency and response action that the user wishes to associate with the message. The system updates the classification model parameters (e.g., weight vector $a^t=(a_1, a_2, \ldots, a_d)$ of the discriminant function) based on the user-supplied input.

Figure 6:
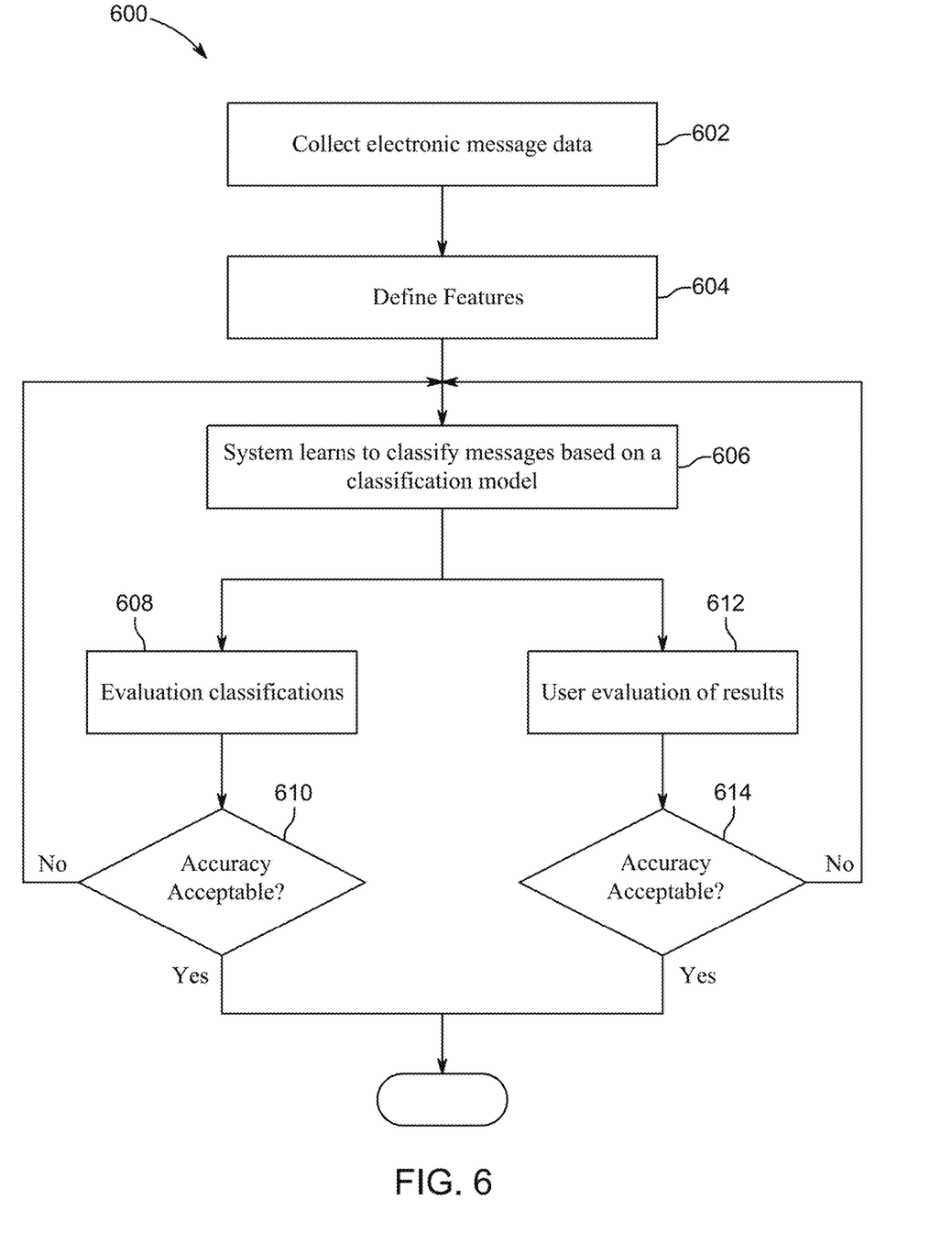
FIG. 6 is a flowchart of a method of system learning according to an embodiment of the present invention.

FIG. 6 is a flowchart of a method 600 of training the system to identify pre-defined features within the message and to classify the message based on the identified features. Method 600 can also be performed by a system the same or similar to the system described in connection with FIG. 3 and having a system architecture the same or similar to the architecture described in connection with FIG. 4A. At 602, electronic messages are collected for building a corpus of training data. Features within the messages are defined at 604 by a user. The system learns to classify messages at 606 by iteratively adjusting the model parameters (e.g., weight vector $a^t=(a_1, a_2, \ldots, a_d)$ of the discriminant function) until a satisfactory level of accuracy is achieved.

Classification accuracy of the system is evaluated at step 608 by classifying a validation set of observations (electronic messages) to determine how closely the system-generated classifications match desired classifications. At 610, if the accuracy is unacceptable, the refinement of the classification model repeats at 606 whereby the model parameters (e.g., weight vector $a^t=(a_1, a_2, \ldots, a_d)$ of the discriminant function) are updated and the results re-evaluated.

Method 600 permits further refinement of the classification model once the system is operational (that is, after the system has constructed the classification model), the refinement being based on user-supplied feedback via a feedback module. Specifically, a user can respond to a system-generated notification notifying the user of a system prediction of a received message's urgency and the system's suggested response action by accepting or rejecting the system result at 612. If, at 614, the user rejects the result, refinement of the classification model repeats anew at 606 with the model parameters (e.g., weight vector $a^t=(a_1, a_2, \ldots, a_d)$ of the discriminant function) being updated and the results re-evaluated based on the user-supplied input.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A computer-implemented method, comprising:
receiving an electronic message directed to a user;
parsing the electronic message to identify pre-defined features contained within the electronic message; and
sending an electronic notification to the user that identifies an action response to be taken by the user, wherein
the electronic notification is generated, after the receiving and prior to the sending, based upon:
  a classification of the electronic message using a classification model/predictor that predicts an urgency level, from a plurality of urgency levels, for the electronic message using the identified pre-defined features contained within the electronic message, and
  the action response being real-time automatically selected based upon a mapping between the urgency level and only one of a plurality of action responses,
the classification model/predictor uses the identified pre-defined features as an input and an output of the classification model/predictor is the urgency level,
the urgency level is a predefined designation indicating how quickly the action response should be undertaken and is based upon the classification of the electronic message, and
the mapping creates a one-to-one correspondence between the plurality of urgency levels and a plurality of different actions.

2. The method of claim 1, wherein
performance of the action response is automatically initiated upon the electronic notification being received by the user.

3. The method of claim 1, wherein
the notification identifies a specific timeframe by which the action response is to be taken.

4. The method of claim 1, wherein
the notification is separate from the electronic message.

5. The method of claim 1, wherein
the classification model/predictor is automatically updated based upon feedback received from the user after receipt of the electronic notification.

6. The method of claim 5, wherein
the feedback includes a modification to the urgency level predicted by the classification model/predictor.

7. The method of claim 5, wherein
the feedback is to the action response.

8. A computer hardware system, comprising:
a processor programmed to initiate executable operations including:
  receiving an electronic message directed to a user;
  parsing the electronic message to identify pre-defined features contained within the electronic message; and
  sending an electronic notification to the user that identifies an action response to be taken by the user, wherein
the electronic notification is generated, after the receiving and prior to the sending, based upon:
  a classification of the electronic message using a classification model/predictor that predicts an urgency level, from a plurality of urgency levels, for the electronic message using the identified pre-defined features contained within the electronic message, and
  the action response being real-time automatically selected based upon a mapping between the urgency level and only one of a plurality of action responses,
the classification model/predictor uses the identified pre-defined features as an input and an output of the classification model/predictor is the urgency level,
the urgency level is a predefined designation indicating how quickly the action response should be undertaken and is based upon the classification of the electronic message, and
the mapping creates a one-to-one correspondence between the plurality of urgency levels and a plurality of different actions.

9. The system of claim 8, wherein
performance of the action response is automatically initiated upon the electronic notification being received by the user.

10. The system of claim 8, wherein
the notification identifies a specific timeframe by which the action response is to be taken.

11. The system of claim 8, wherein
the notification is separate from the electronic message.

12. The system of claim 8, wherein
the classification model/predictor is automatically updated based upon feedback received from the user after receipt of the electronic notification.

13. The system of claim 12, wherein
the feedback includes a modification to the urgency level predicted by the classification model/predictor.

14. The system of claim 12, wherein
the feedback is to the action response.

15. A computer program product, comprising:
a computer-readable storage medium having program code stored therein,
  receiving an electronic message directed to a user;
  parsing the electronic message to identify pre-defined features contained within the electronic message; and
  sending an electronic notification to the user that identifies an action response to be taken by the user, wherein the electronic notification is generated, after the receiving and prior to the sending, based upon:

a classification of the electronic message using a classification model/predictor that predicts an urgency level, from a plurality of urgency levels, for the electronic message using the identified pre-defined features contained within the electronic message, and the action response being real-time automatically selected based upon a mapping between the urgency level and only one of a plurality of action responses, the classification model/predictor uses the identified pre-defined features as an input and an output of the classification model/predictor is the urgency level, the urgency level is a predefined designation indicating how quickly the action response should be undertaken and is based upon the classification of the electronic message, and the mapping creates a one-to-one correspondence between the plurality of urgency levels and a plurality of different actions.

16. The computer program product of claim 15, wherein performance of the action response is automatically initiated upon the electronic notification being received by the user.

17. The computer program product of claim 15, wherein the notification identifies a specific timeframe by which the action response is to be taken.

18. The computer program product of claim 15, wherein the notification is separate from the electronic message.

19. The computer program product of claim 15, wherein the classification model/predictor is automatically updated based upon feedback received from the user after receipt of the electronic notification.

20. The computer program product of claim 19, wherein the feedback includes a modification to the urgency level predicted by the classification model/predictor.

* * * * *